United States Patent [19]

Giuffré et al.

[11] Patent Number: 4,895,634

[45] Date of Patent: Jan. 23, 1990

[54] POROUS SEPARATORY MEMBER ENTIRELY MADE OF POLYPHENYLENE SULFIDE FOR THE ELECTROLYSIS OF WATER

[75] Inventors: Luigi Giuffré; Giovanni Modica; Alberto Pagani, all of Milan, Italy; Giancarlo Imarisio, Brussels, Belgium

[73] Assignee: Fratelli Testori S.p.A., Milan, Italy

[21] Appl. No.: 207,334

[22] Filed: Jun. 14, 1988

[30] Foreign Application Priority Data

Jun. 22, 1987 [IT] Italy ............................. 20989 A/87

[51] Int. Cl.$^4$ ............................................. C25B 13/08
[52] U.S. Cl. ................................... 204/296; 204/129; 521/27; 521/30; 521/33; 521/38; 528/373
[58] Field of Search ................ 204/129, 252, 295-296; 521/27, 30, 33, 38; 528/373

[56] References Cited

U.S. PATENT DOCUMENTS 4,110,265 8/1978 Hodgdon ............................ 204/296
4,707,228 11/1987 Rubak ................................. 204/252

Primary Examiner—John F. Niebling
Assistant Examiner—Kathryn Gorgos
Attorney, Agent, or Firm—Ladas & Parry

[57] ABSTRACT

A porous separator, to be used in electrolyzers for producing hydrogen and oxygen by water electrolysis, consists of a fabric or felt entirely made of polyphenylene sulfide (PPS). In order to reduce the voltage drop caused by the separator, the PPS polymeric chain can be made ionically active by the presence thereon of polar groups, such as sulfonic, carboxylic or phosphonic groups.

The method for producing the separator comprises the preparation, according to conventional weaving or felt manufacturing techniques, of a fabric or felt entirely made of PPS and the subsequent functionalization for introducing polar groups in the polymeric chain. The functionalization can be carried out either on the starting material, such as PPS polymer powder or flakes, or in any other step of the production of fabric or felt.

4 Claims, No Drawings

POROUS SEPARATORY MEMBER ENTIRELY MADE OF POLYPHENYLENE SULFIDE FOR THE ELECTROLYSIS OF WATER

DESCRIPTION

The present invention concerns a porous separator to be used in electrolytic cells for producing hydrogen and oxygen by water electrolysis, the separator being disposed between anode and cathode of the cell. The invention also concerns the method for producing said separator.

The conventional electrolyzers for water electrolysis generally comprise one or more electrolytic cells, every cell consisting of two electrodes (cathode and anode) immersed in a suitable electrolyte. An electrolyte permeable separatory member is positioned between cathode and anode. The separator divides the cell into anodic and cathodic compartments for avoiding the mutual contamination of hydrogen and oxygen evolved at cathode and anode respectively, which entails the danger of formation of explosive mixtures. The separatory members, obviously, will have to present as low as possible resistance to the electric current flowing between the electrodes.

Conventional separators are made of asbestos, in form of fabric or cardboard. Such a material has a good resistance against the attack of strongly alkaline substances used as electrolyte, provided the inner temperature of the cell is not more than 90°–100° C. It is well-known that, beyond this temperature, a rapid degradation of this type of separators occurs. It is also known that asbestos separators cannot be used with acidic electrolytes.

In order to be able to operate at higher temperature, involving a significant decrease of the working voltage of the cell and, therefore, a sharp improvement of the energy efficiency, a variety of separators have been proposed, consisting of organic and/or inorganic materials. In this connection, is must be pointed out that an increase of the cell temperature beyond certain limits has to be obligatorily coupled with a pressure increase, in order to prevent the electrolyte from boiling. The pressure increase is, however, advantageous in that it involves a decrease of the diameter of the gaseous bubbles in the electrolyte, which consequently decrease the voltage drop in the electrolyte itself. By operating under pressure an energy saving is also achieved, because the electrolyzer produces already compressed gases, whereby part of the subsequent compression work for their commercialization becomes unnecessary.

For the purposes of the present invention, the ionically active separator described in the Italian Patent Application, open-laid, No. 24836 A/80, essentially consisting of a support and an ionically active part, presents a particular interest. The support is preferably in form of fabric or fibrils and is made of a variety of materials, preferably polytetrafluoroethylene (PTFE). The ionically active part, in the form of a support coating or impregnating substance, consists of a polymer, namely polyphenylene sulfide, functionalized according to various methods, sulfonated in the particular case.

However, the preparative methods described in the above-mentioned Patent Application are very complex and complicated ones. Particularly the need of a high temperature molding for securing the PPS to the support limits the size of the product which can be obtained in the practice. In fact, during the molding, pressures of 150,000–180,000 $N/m^2$ and temperatures of 300°–450° C. are required. Consequently, the molds for practical use have rather small sizes owing to the actual impossibility to realize a sufficiently precise coupling of the two shells of the mold, on account also of the thickness of the article being at most a few millimeters. Consequently, the article will be compulsorily subjected to non-uniform pressures, whereby a non-homogeneous article will be obtained. In other words, when using such a separator in a cell for water electrolysis, a non-uniform current density will result. This fact can involve serious consequences, well-known to those skilled in the art, particularly in the case of very high current densities and of electrode separation distances substantially equal to the separator thickness.

Moreover, the presence of the PTFE separator itself, in form of either fibrils or fabric, represents a cause of non-homogeneity, intrinsic to this type of separator. Mixing spots can, therefore, result for the gases (hydrogen and oxygen) evolved at the electrodes, owing to the known, strongly hydrophobic nature of PTFE, which for this reason shows a higher affinity for the gases than for the electrolytes.

As a further drawback, PPS shows a very poor adhesion for the PTFE support, which possesses well-known, excellent anti-adhesion properties.

Supports made of different materials from PTFE were in fact foreseen in the above-mentioned Application, but their use is problematic in the practice, because very few materials are known which withstand the attack of concentrated caustic potash at temperatures higher than 100° C. In the practice, the only other utilizable material is nickel, which, however, is an electric conductor. This can impair the requisible insulating properties of a separator, even if coated with PPS, in the case of a fortuitous contact with energized cell parts. This can easily occur owing to defects present, for various reasons, in the PPS coating and brings about serious, well-known consequences. The only conclusion, therefore, is that PTFE represents the only material practically utilizable.

At least, serious drawback of such a known separator consists in PTFE and PPS having very different thermal expansion coefficients, which brings about a peeling effect between the two materials.

The object of the present invention is to obviate the above-mentioned drawbacks of the separators according to the known art, by providing a separator, which, even in industrial sizes of a few square meters, assures, as far as it is concerned a uniform current density between the electrodes, owing to its physical, structural and chemical homogeneity.

Another object of the present invention is to provide said type of separator which can be produced easily and in industrial sizes, yet assuring the complete separation of hydrogen and oxygen evolving at the respective electrodes.

It is to be emphasized, at this point, that the requisite above-mentioned characteristics of the separator according to the present invention cannot be renounced, if a porous separator has to be produced for use in water electrolyzers operating at current densities of about 1 $A/cm^2$ and electrode separation distances substantially equal to the separator thickness. In this case, in fact, the slightest non-uniformity present in the separator causes a localized, preferential way of current flow bringing about a possible piercing of the electrodes and/or the separator itself and the mixing of the gases evolving at the electrodes, whereby explosive mixtures are formed.

The above objects are achieved by a porous separator according to the invention, characterized in that it consists of fabric or felt entirely made of polyphenylene sulfide.

The term "felt" herein is to be meant in the broadest sense as comprising also the so-called non-woven materials and the needle-felts, with or without a fabric of support. In the presence of a fabric of support, both the felt and the fabric of support are obviously made of the same material, i.e. PPS.

This complete elimination of the support from the separator of the Patent Application No. 24836 A/80 allows a separator to be obtained, having the required size and homogeneity level, in a surprisingly easy manner, according to the conventional techniques for producing fabrics and felts.

Preferably the fabric or the felt forming the separator are obtained from commercially available polyphenylene sulfide fibers. Suitably, the particular type of fibers known as flake is used.

The substance (weight per square meter) of fabric or felt is preferably in the range of 300 to 800 g/m².

Because the separator according to the invention solves the problem of the size limitations inherent to the separators of the Patent Application No. 24836 A/80, its employment is allowed also in the usual electrolyzers operating at low temperatures (about 80° C.) and low current density (about 0.2 A/cm²), but having large-sized electrodes, such as about a few square meters. In these equipment, it will be possible to replace the classic asbestos separator with the separator according to the invention, with consequent remarkable benefits for the environment (in view of the dangerousness of asbestos), the life of the separator itself and the saving of energy, owing to the lower cell voltage.

In order to reduce the voltage drop due to the separator, this member is, furthermore, characterized in that the polymeric chain of polyphenylene sulfide carries polar groups making the material ionically active. These polar groups can, for example, be sulfonic, carboxylic or phosphonic groups.

The method for producing a separator of polyphenylene sulfide having on the polymeric chain polar groups according to the invention comprises the preparation, using conventional techniques for producing fabrics or felts, of a fabric or felt entirely made of polyphenylene sulfide, this polymer being then subjected to a functionalization procedure for introducing polar groups in the polymeric chain, characterized in that the functionalization is carried out indifferently either on the starting material or in any other step of the production of fabric or felt.

Thus, the functionalization can be carried either directly on the PPS polymer powder or PPS fibers employed for producing the fabric or the felt or on the fabric or felt obtained from the PPS fibers. The functionalization can, however, be carried out also in intermediate steps of the production of the fabric or felt.

The method according to the invention is further characterized in that the polar groups are sulfonic, carboxylic or phosphonic groups. The functionalization is indifferently carried out either on the polyphenylene sulfide polymer powder or fibers, or after the production of fabric or felt.

The separator according to the invention, being of the polar type, allows a significant energy saving to be obtained, owing to the very low voltage drop (about 0.1–0.2 ohm cm²) caused by the electric current flow: this characteristic remains unchanged in the long run.

The separator according to the invention allows a temperature up to 180° C., preferably between 120° and 160° C., to be maintained in the interior of the electrolyser, with all the consequent, above-mentioned advantages inherent to a higher operating temperature of the cell. Moreover, the remarkable physical, structural and chemical homogeneity of the separator assures, as far as this latter is concerned, a uniform current density between the electrodes even with electrodes of large size.

The production of the separator, even of large size, is very easy, because the thoroughly tested weaving and felt manufacturing techniques are employed for the purpose.

The functionalization of PPS is also very easy.

The fabric or felt forming the separator has a substance in the range between 250 and 1200 g/m², a thickness between 0.5 mm and 6.0 mm and a thread or fiber diameter corresponding to between 1 and 6 deniers.

These properties allow a separator to be obtained which is extremely reliable and ecological and has a very long life and interesting characteristics of energy saving.

The invention will be better understood from the following examples, which obviously are not to be meant as limitative of the invention itself.

EXAMPLE 1

A sample of needle-felt obtained from 100% PPS fibers of 3 deniers and having the following characteristics:

substance: 500 g/m²
thickness: 2.5 mm
air permeability: 350 dm³/dm² min at 200 Pascals
bubble point: 4 cm H₂O at 20° C.
water uptake: 75%
voltage drop: 0.324 ohm cm² in 30% KOH at 100° C.,
  was sulfonated with liquid SO₃ in 1,2-dichloroethane at 0° C.

When the reaction was completed, the product, stabilized with water and washed to neutrality, showed a water uptake of 76.5%, based on the total weight of the wet sample.

The sample was subjected to life tests in 50% KOH, at the boiling temperature of the solution (140°–145° C.) for 500 hours.

At the end of the test, the sample was washed, weighed again and evaluated for possible structural changes.

The sample passed successfully the examination showing the same characteristics of the starting material. The sample was then employed in a nickel electrolytic cell, with nickel electrodes leaning upon the separator.

The current density was 1 A/cm², the test temperature 120° C. at atmospheric pressure and the electrolyte a solution of 30% KOH. The test was carried out for 5000 hours.

The purity of gases and the voltage drop caused by the separator was controlled throughout the test.

The purity of hydrogen was at most 99.998%, the purity of oxygen at most 99.99% and the voltage drop caused by the separator was 0.19–0.21 ohm cm², throughout the test. At the end, the separator was recovered and again evaluated. The sample showed the same characteristics of samples never used in electrolytic cells.

EXAMPLE 2

A PPS felt sample having the same characteristics of the sample described in Example 1 was sulfonated in conc. Sulfuric acid (96%) at 100°–110° C. for two hours. After stabilization the water, the sample was evaluated as described in Example 1 with the following results:
Voltage drop less than 0.250 ohm cm$^2$ in 30% KOH at 100° C.,
hydrogen purity more than 99.99%,
oxygen purity more than 99.96%,
bubble point: 9 cm H$_2$O at 20° C.

EXAMPLE 3

A sulfonated sample as described in Example 1 was tested in a suitable electrolytic cell at the autogenous pressure of 30 bars for 5000 hours.

The gas purity throughout the test was at most 99.99% for hydrogen and 99.97% for oxygen; the voltage drop was about 0.20 ohm cm$^2$.

At the end of the test the sample showed the same characteristics of a sample never tested in electrolytic cells.

EXAMPLE 4

A PPS fabric sample obtained from 100% PPS fibers of 3 deniers and having the following characteristics:
Substance: 400 g/m$^2$
Thickness: 1.5 mm
Type of fabric: Twill
Warp count 17/2 n (metric) threads/cm 18
Weft count 17 n (metric) threads/cm 26
Air permeability: 110 dm$^3$/dm$^2$ min. at 200 Pascals
Voltage drop: 0.25 ohm cm$^2$ in 30% KOH at 100° C.
Bubble point in water: 17 cm H$_2$O at 20° C.
Water uptake: 28.33%, was sulfonated according to the same procedure described in Example 1.

When subjected to the same tests of Example 1 and 3, the following results were obtained:
Water uptake: 29.5%
Bubble point: 20.5 cm H$_2$O at 20° C.
Gas purity:
   at atmospheric pressure
      hydrogen 99.99%
      oxygen 99.9%
   at 30 bars
      hydrogen 99.98%
      oxygen 99.90%

EXAMPLE 5

A fabric sample with the same characteristics of Example 4 was sulfonated in 96% sulfuric acid at 100°–110° C. for 2 hours.

After stabilization with water, the sample showed the following characteristics:
Water uptake: 33.6%
Voltage drop 0.19 ohm cm$^2$ in 30% KOH at 100° C.
Gas purity: similar to Example 4.

EXAMPLE 6

The same as the Example 4, except that the sulfonation was carried out with sulfuric acid/20% oleum mixture in a 2:1 (volume/volume) ratio.
Reaction temperature: 20° C.
Time: 2 hours
   Characteristics of the resulting separator:
Bubble point: 20.5 cm H$_2$O at 20° C.,
Water uptake: 31.5%
Voltage drop 0.18 ohm cm$^2$ in 30% KOH at 100° C.
Gas purity: the same as Example 4.

EXAMPLE 7

A sample with the same characteristics of Example 1 was functionalized by introducing carboxylic groups.

The reaction was carried out with phosgene as carboxylating agent, the sample being immersed in an inert solvent containing dissolved a Lewis acid as catalyst (aluminium chloride, iron chloride, zinc chloride, etc.).

At the end of the reaction, the sample was treated with hot water for stabilization and evaluated as described in Examples 1 and 3, obtaining the following results:
Voltage drop 0.27 ohm cm$^2$ in 30% KOH at 100° C.
Water uptake: 76%
Bubble point 8 cm H$_2$O at 20° C.,
Gas purity:
   at atmospheric pressure
      hydrogen 99.99%
      oxygen 99.8%
   at 30 bars
      hydrogen 99.97%
      oxygen 99.6%

EXAMPLE 8

A sample with the same characteristics of Example 4 was functionalized by introducing carboxylic groups according to the method of Example 7.

The following results were obtained:
Voltage drop less than 0.25 ohm cm$^2$ in 30% KOH at 100° C.
Bubble point: 18 cm H$_2$O at 20° C.,
Gas purity
   at atmospheric pressure:
      hydrogen 99.99%
      oxygen 99.98%

EXAMPLE 9

Felt and fabric samples, similar to those described in Examples 1 and 4 respectively, were functionalised with phosphonic groups by reaction with phosphorus oxychloride in inert solvents and in the presence of Lewis acids as catalyst.

The characteristics of the resulting separators were, at atmospheric pressure:
Felt:
   Bubble point: 8 cm H$_2$O at 20° C.
   Voltage drop : 0.26 ohm cm$^2$ in 30% KOH at 100° C.
   Water uptake: 77%
   Gas purity:
      hydrogen 99.99%
      oxygen 99.89%
Fabric:
   Bubble point: 21 cm H$_2$O at 20° C.
   Voltage drop: 0.29 ohm cm$^2$ in 30% KOH at 100° C.
   Water uptake: 27%
   Gas purity:
      hydrogen 99.99%
      oxygen 99.90%

EXAMPLE 10

PPS flake samples were sulfonated as described in Example 2, carboxylated as described in Example 7 and phosphonated as described in Example 9.

After product stabilization with potash for converting the acidic groups introduced in the polymeric chain into the corresponding potassium salts, the usual procedures of spinning, weaving and/or needling were carried out on the functionalized flakes in order to obtain yarns, fabrics, needle-felts and non-woven felts.

The resulting samples were again evaluated according to the procedure of Example 1 with the following results:

| Flake functionalization | Obtained product | Substance g/m$^2$ | Thickness mm | Voltage drop ohm cm$^2$ in 30% KOH at 100° C. | Bubble point cmH$_2$O | Water uptake % | % H$_2$ | % O$_2$ |
|---|---|---|---|---|---|---|---|---|
| Sulfonation | Fabric - Twill | 400 | 2.2 | 0.21 | 19 | 29 | 99.99 | 99.98 |
| " | Fabric - Cloth | 300 | 1.5 | 0.19 | 18 | 28 | 99.98 | 99.97 |
| " | Needle - felt | 500 | 2.0 | 0.20 | 9 | 77 | 99.998 | 99.99 |
| " | Needle - felt | 300 | 1.5 | 0.18 | 8 | 76 | 99.998 | 99.99 |
| Carboxylation | Fabric - Twill | 400 | 2.2 | 0.24 | 21 | 28 | 99.992 | 99.98 |
| " | Fabric - Cloth | 300 | 2.0 | 0.23 | 20 | 29 | 99.991 | 99.97 |
| " | Needle - felt | 500 | 2.0 | 0.26 | 9 | 75 | 99.996 | 99.98 |
| " | Needle - felt | 300 | 1.5 | 0.24 | 8 | 76 | 99.991 | 99.96 |
| Phosphonation | Fabric - Twill | 400 | 2.2 | 0.29 | 21 | 28 | 99.99 | 99.92 |
| " | Fabric - Cloth | 300 | 2.0 | 0.26 | 20 | 28 | 99.99 | 99.90 |
| " | Needle - felt | 500 | 2.0 | 0.27 | 8 | 75 | 99.99 | 99.92 |
| " | Needle - felt | 300 | 1.5 | 0.24 | 8 | 75 | 99.98 | 99.87 |

EXAMPLE 11

A needle-felt sample with the same characteristics of Example 1, but not functionalized, was tested in an electrolytic cell under the same conditions of Example 1, with the following results:
Voltage drop: 0.324 ohm cm$^2$ in 30% KOH at 100° C.
Gas purity:
 hydrogen 99.98%
 oxygen 99.96%

EXAMPLE 12

A fabric sample with the same characteristics of Example 4, but not functionalized, was tested in an electrolytic cell under the same conditions of Example 1, with the following results:
Voltage drop: 0.25 ohm cm$^2$ in 30% KOH at 100° C.
Gas purity:
 hydrogen 99.99%
 oxygen 99.96%

EXAMPLE 13

A felt sample obtained from 100% PPS fibers of 4 deniers and having the following characteristics:
Substance: 620 g/m$^2$
Thickness: 1.45–1.55 mm
Water uptake: 82%
Voltage drop: 0.20 ohm cm$^2$ in 30% KOH at 100° C.
Air permeability: 85–115 dm$^3$/dm$^3$ min at 200 Pascals
Bubble point in water: 25 cm H$_2$O at 20° C.
not functionalized was tested in an electrolytic cell under the same conditions of Example 1, with the following results:
Voltage drop: 0.18–0.20 ohm cm$^2$
Gas purity:
 hydrogen 99.992%
 oxygen 99.983%

EXAMPLE 14

Felt sample like that of Example 13.
Substance: 700 g/m$^2$
Thickness: 2 mm
Water uptake: 81%
Voltage drop: 0.25 ohm cm$^2$ in 30% KOH at 100° C.
Air permeability: 90–120 dm$^3$/dm$^3$ min at 200 Pascals
Bubble point: 30 cm H$_2$O at 20° C.
Test as described in Example 1.
Gas purity:
 hydrogen 99.993%
 oxygen 99.987%

EXAMPLE 15

Felt sample like that of Example 13. Fibers of 6 deniers.
Substance: 800 g/m$^2$
Thickness: 2 mm
Water uptake: 80%
Voltage drop: 0.30 ohm cm$^2$ in 30% KOH at 100° C.
Air permeability: 100–120 dm$^3$/dm$^3$ min at 200 Pascals
Bubble point: 22 cm H$_2$O at 20° C.
Gas purity:
 hydrogen 99.990%
 oxygen 99.970%

EXAMPLE 16

Sample as that of Example 13. Fibers of 3 deniers.
Substance: 900 g/m$^2$
Thickness: 3 mm
Water uptake: 88%
Voltage drop: 0.29 ohm cm$^2$ in 30% KOH at 100° C.
Air permeability: 80–90 dm$^3$/dm$^3$ min at 200 Pascals
Bubble point in water: 35 cm H$_2$O at 20° C.
Gas purity:
 hydrogen 99.998%
 oxygen 99.992%

We claim:
1. A porous separatory member to be placed between anode and cathode of electrolytic cells for producing hydrogen and oxygen by water electrolysis, said member consisting of a fabric or felt entirely made of polyphenylene sulfide; said polyphenylene sulfide carrying on said polyphenylene sulfide's polymeric chain polar groups which make the separator ionically active.

2. A separatory member as claimed in claim 1 wherein the polar group comprises sulfonic, carboxylic or phosphonic groups.

3. A separatory member as claimed in claim 2, wherein the fabric or felt has a mass in the range between 250 and 1200 g/m$^2$, a thickness of between 0.5 and 6 mm and a thread or fiber diameter between 1 and 6 deniers.

4. A separatory member as claimed in claim 1, wherein the fabric or felt has a mass in the range between 250 and 1200 g/m$^2$, a thickness of between 0.5 and 6 mm and a thread or fiber diameter between 1 and 6 deniers.

* * * * *